(12) United States Patent
Hollander et al.

(10) Patent No.: US 9,961,206 B1
(45) Date of Patent: May 1, 2018

(54) SYSTEM AND METHOD FOR ADAPTING REAL TIME INTERACTIVE VOICE RESPONSE (IVR) SERVICE TO VISUAL IVR

(71) Applicant: Jacada Ltd., Herzliya (IL)

(72) Inventors: Gideon Hollander, Hod Ha'Sharon (IL); Adi Toppol, Dunwoody, GA (US)

(73) Assignee: JACADA LTD., Herzliya (IL)

( * ) Notice: Subject to any disclaimer, the term of this patent is extended or adjusted under 35 U.S.C. 154(b) by 5 days.

(21) Appl. No.: 15/389,440

(22) Filed: Dec. 22, 2016

(51) Int. Cl.
*H04M 1/64* (2006.01)
*H04M 3/527* (2006.01)
*H04M 3/42* (2006.01)

(52) U.S. Cl.
CPC ....... *H04M 3/527* (2013.01); *H04M 3/42153* (2013.01); *H04M 2201/60* (2013.01); *H04M 2203/251* (2013.01)

(58) Field of Classification Search
CPC .. H04M 2203/252; H04M 3/493; H04W 4/16
USPC ............................................ 379/88.01–88.19
See application file for complete search history.

(56) References Cited

U.S. PATENT DOCUMENTS

| | | | |
|---|---|---|---|
| 5,884,032 A | 3/1999 | Bateman et al. | |
| 6,301,480 B1 | 10/2001 | Kennedy, III et al. | |
| 7,254,641 B2 | 8/2007 | Broughton et al. | |
| 7,424,442 B2 | 9/2008 | Wong et al. | |
| 8,054,952 B1 | 11/2011 | Or-Bach et al. | |
| 2003/0005076 A1* | 1/2003 | Koch | H04M 7/0027 709/217 |
| 2005/0002514 A1 | 1/2005 | Shafiee et al. | |
| 2006/0093124 A1 | 5/2006 | Inamdar | |
| 2007/0265873 A1 | 11/2007 | Sheth et al. | |
| 2009/0154671 A1 | 6/2009 | Weiss et al. | |
| 2009/0248420 A1 | 10/2009 | Basir et al. | |
| 2010/0190477 A1 | 7/2010 | Williams et al. | |
| 2010/0241664 A1 | 9/2010 | LeVasseur et al. | |
| 2011/0019812 A1 | 1/2011 | Sankaranarayanan | |
| 2011/0047221 A1 | 2/2011 | Watanabe et al. | |

(Continued)

OTHER PUBLICATIONS

Lisa Hoover, "Fonolo Skips Automated Customer Service Phone Trees, Now on iPhone", http://lifehacker.com/5470697/fonolo-skips-automated-customer-service- . . . , pp. 1-2.

(Continued)

*Primary Examiner* — Solomon Bezuayehu
(74) *Attorney, Agent, or Firm* — Volentine & Whitt, PLLC

(57) ABSTRACT

An interactive voice response (IVR) system adaptor causes the media player of an IVR system to present a user with a first option to proceed with an audio-only call and a second option to experience a multimedia call including display of visual information on the user device. When the user selects the first option, the proxy IVR interface passes first messages output from the media player to an application server of the IVR system, and passes second messages from the application server to the media player. When the user selects the second option, the IVR system adaptor receives third messages from the user device, translates the third messages into the first messages, passes the first messages to the application server, in response thereto receives the second messages from the application server, converts the second messages to fourth messages, and sends the fourth messages to the user device.

20 Claims, 12 Drawing Sheets

(56) References Cited

U.S. PATENT DOCUMENTS

| | | |
|---|---|---|
| 2011/0103559 A1 | 5/2011 | Andrews et al. |
| 2011/0293077 A1 | 12/2011 | Dubut et al. |
| 2012/0008755 A1 | 1/2012 | Mittal |
| 2012/0022938 A1 | 1/2012 | McNea et al. |
| 2012/0044932 A1 | 2/2012 | Sidhu et al. |
| 2012/0069976 A1 | 3/2012 | Tischer et al. |
| 2012/0129514 A1 | 5/2012 | Beenau et al. |
| 2012/0190333 A1 | 7/2012 | Portman et al. |
| 2012/0214516 A1 | 8/2012 | Rosenberg |
| 2012/0237009 A1 | 9/2012 | Szpilfogel |
| 2012/0260194 A1 | 10/2012 | Kennedy et al. |
| 2012/0265694 A1 | 10/2012 | Tuchman et al. |
| 2012/0265695 A1 | 10/2012 | Tuchman et al. |
| 2012/0265696 A1 | 10/2012 | Tuchman et al. |
| 2012/0265697 A1 | 10/2012 | Tuchman et al. |
| 2012/0265800 A1 | 10/2012 | Tuchman et al. |
| 2012/0266258 A1 | 10/2012 | Tuchman et al. |
| 2012/0309351 A1 | 12/2012 | Dutta |
| 2012/0320903 A1 | 12/2012 | Ilagan |
| 2013/0003957 A1 | 1/2013 | Singh et al. |
| 2013/0038519 A1 | 2/2013 | Bi et al. |

OTHER PUBLICATIONS

"Groupama releases the << Groupama toujours là >> iPhone application", Jan. 3, 2011, http://www.sqli.com/eng/news/Press-releases/Groupama-releases-the-Gr . . . , pp. 1-2.

\* cited by examiner

TO 4020

SYSTEM AND METHOD FOR ADAPTING REAL TIME INTERACTIVE VOICE RESPONSE (IVR) SERVICE TO VISUAL IVR

BACKGROUND AND SUMMARY

This invention pertains to the field of interactive voice response (IVR) systems and services.

In some aspects, the present invention is directed to a system and method for converting an existing IVR system into a visual IVR (VIVR) system.

Automated telephone-based customer support systems, such as auto attendant (AA) systems, (which may also be referred to as automated attendant systems, virtual receptionist systems, interactive voice response (IVR) systems, AA/IVR systems, and other names) have evolved from relatively simple devices to more complex computerized systems for handling calls pertaining to a variety of issues. Modern IVR systems can often allow a caller to resolve an issue through self service, without the need for a human agent to provide agent-assisted service. And in cases where agent-assisted service is required to address a caller's issue, an IVR system may facilitate connecting the caller to the appropriate agent for resolving the issue.

For example, an IVR system may automatically answer a telephone call from a caller, play a standard message to the caller, and then await a response from the caller. In some IVR systems, this response may come in the form of the caller depressing a particular telephone key, which often generates a standardized set of tones called Dual-tone multi-frequency tones (DTMF), and/or in the form of voice input for more sophisticated voice recognition systems. Based on the caller response, the system may process the incoming call appropriately to resolve one or more issues which prompted the caller to place the call.

Auto attendant systems often have a complex menu structure, via which an incoming caller may, for example, proceed through a complex decision tree, being presented with a series of recorded voice prompts (or generated voice prompts utilizing Text-To-Speech) and providing corresponding responses, in order to connect the incoming caller with a particular person, departmental function, or information to resolve the incoming caller's issue(s). Some IVR systems operate using voice communication over traditional Public Switched Telephone Networks (PSTN), wireless radio infrastructure, and/or voice-over-IP technologies.

Many commercial owners or users of IVR systems also operate websites which can provide additional information to a customer, and in this case, one or more voice prompts which are provided by the auto attendant system may encourage incoming callers to stop using the telephone-based IVR system, and instead to switch to using a web browser to engage in a self service operation with a computer-based customer support system.

However, callers to an organization's telephone-based auto attendant system may experience frustration with unsuccessful IVR interactions or encounter long wait times during peak call periods. Computer-based customer support systems may provide (e.g., via a network) a broader range of automated information and with little or no wait times where a customer seeks a resolution to the customer's issue during a self service session. Moreover, if the computer-based customer support system fails to allow the customer to resolve an issue, the customer may still need to speak with a customer service agent to resolve the issue. So it is desirable to integrate the experience of an IVR service to a customer, with a more robust set of features which can be provided to a caller who has an intelligent device such as a smartphone which has a display device and can present texts and images to the caller and present options in a visual manner via a VIVR service.

However, there is already a huge and valuable installed infrastructure of IVR systems. Also, even though it may be desirable to provide a VIVR service to customers, there continue to be callers from traditional "dumb" telephones which do not have the ability to experience a VIVR service and which will require the traditional IVR service.

Accordingly, it would be advantageous to provide a system and method for adapting an existing real time IVR system to provide a VIVR service.

The present invention comprises a system and method for adapting an existing real time IVR system to provide a VIVR service.

In one aspect of the invention, an interactive voice response (IVR) system adaptor is provided for adapting an IVR system to support a visual IVR (VIVR) service, wherein the IVR system includes an application server and a media player which is configured to interface with an incoming call from a user via a user device. The IVR system adaptor comprises: a proxy IVR interface which is configured to instruct the media player to present the user with a first option to proceed with an audio-only call and a second option to experience a multimedia call including display of visual information on the user device; and a visual interaction renderer. When the user selects the first option, the proxy IVR interface passes first messages output from the media player to the application server, and passes second messages from the application server to the media player. When the user selects the second option, the visual interaction renderer receives third messages from the user device and translates the third messages into the first messages. The proxy IVR interface passes the first messages to the application server, and in response thereto receives the second messages from the application server, and passes the second messages to visual interaction renderer. The visual interaction renderer converts the second messages to fourth messages, and sends the fourth messages to the user device.

In another aspect of the invention, a method is provided for adapting an IVR system to support a visual IVR (VIVR) service, wherein the IVR system includes an application server and a media player which is configured to interface with an incoming call from a user via a user device. The method comprises: instructing the media player to present the user with a first option to proceed with an audio-only call and a second option to experience a multimedia call including display of visual information on the user device; receiving a response from the user device. When the response indicates selection of the first option, the method includes passing, via an IVR system adaptor, first messages output from the media player to the application server, and passing via the IVR system adaptor second messages from the application server to the media player. When the response indicates selection of the second option, the method includes: receiving third messages from the user device via the IVR system adaptor, the IVR system adaptor translating the third messages into the first messages, passing the first messages to the application server, and in response thereto receiving the second messages from the application server, converting the received second messages to fourth messages, and sending the fourth messages to the user device.

In yet another aspect of the invention, a system comprises: a media player; an application server; and an interactive voice response (IVR) system adaptor. The media player is configured to interface with an incoming call from a user via a user device, to provide prompts to the user and to receive responses from the user, and to output first messages including information corresponding to the responses from the user. The application server is configured to receive the incoming first messages, and in response thereto to output second messages indicating specific ones of the prompts to be provided to the user. The IVR system adaptor is configured to instruct the media player to present the user with a first option to proceed with an audio-only call and a second option to experience a multimedia call including display of visual information on the user device. When the user selects the first option, the IVR system adaptor passes the first messages output from the media player to the application server, and passes the second messages from the application server to the media player. When the user selects the second option, the IVR system adaptor receives third messages from the user device, converts the third messages into the first messages, passes the first messages to the application server, receives the second messages from the application server in response to the first messages, converts the second messages to fourth messages, and sends the fourth messages to the user device.

DETAILED DESCRIPTION

Figure 1:
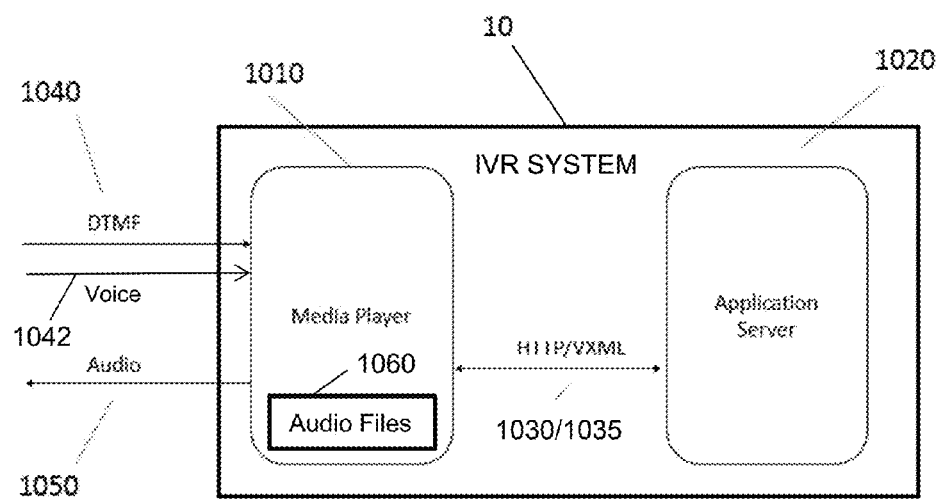
FIG. 1 illustrates an example of an interactive voice response (IVR) system.

In the description to follow an individual may be referred to as a "user," a "caller, or a "customer." It should be understand that these terms are used interchangeably, depending on context, to refer to an individual who has an issue which they wish to resolve. The issue may pertain to a technical problem that the individual is experiencing with a product or service provided by a company or organization, a need for information about a company or organization and/or its products or services, a billing problem, or any of a variety of other issues for which an individual may seek assistance through an interactive voice response (IVR) system, and/or via an interaction with a Visual IVR (VIVR) system.

Also the description to follow mentions various "messages." Here, a message should be understood to mean a discrete unit of communication intended by a source device or functional block for consumption by some other recipient device or functional block (or group of devices or functional blocks). Such messages may be conveyed using appropriate communication protocols (e.g., hypertext transfer protocol (HTTP)) and in appropriate formats (e.g., hypertext markup language (HTML); voice XML (VXML)) as long as the protocol(s) and format(s) are recognized by both the source and the recipient(s). In some embodiments employing some communication protocols, a message may be conveyed from a source to a recipient via a plurality of data packets.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 shows an example of an interactive voice response (IVR) system 10. It should be apparent that actual implementations from different IVR vendors may implement the IVR differently, and FIG. 1 is meant to convey a logical implementation.

In more detail, IVR system 10 may be employed to service callers into an organization. Callers interact via their "user device" (e.g., any telephone) by listening to audio prompts via audio connection or channel 1050 and responding or selecting options by utilizing the 0-9 keys on the telephone keypad to respond utilizing a Dual-Tone Multi-Frequency (DTMF) signal 1040, and/or optionally via voice responses in a voice signal 1042.

In more detail, still referring to FIG. 1, voice and/or DTMF responses are received by Media Player 1010, and passed to Application Server 1020 for example via HTTP/S as a GET or POST request (or by another suitable communication protocol) ("first message(s)") 1030. Application Server 1020 parses the inbound message(s) to determine the user input via DTMF signal 1040 and/or voice signal 1042, and determines the next action to be performed to handle the user's call, such as requesting additional information from the caller or responding with additional data. To do so, Application Server 1020 constructs one or more VXML return message(s), for example, ("second message(s)") 1035 and sends it/them to Media Player 1010. Media Player 1010 reads second message(s) 1035 which effectively instructs Media Player 1010 to select the appropriate Audio file(s) 1060 among a collection of audio files stored at Media Player 1010 (or optionally in external storage), and to play the selected Audio file(s) 1060 to the caller via voice connection 1050 as an audio prompt. This cycle repeats until conclusion of the interaction with the user.

As explained above, it is desirable to integrate the experience of an IVR service to a customer, with a more robust set of features which can be provided to a caller who has an intelligent user device, such as a smartphone which has a display device and can present texts and images to the caller and present options in a visual manner via a VIVR service.

Figure 2A:
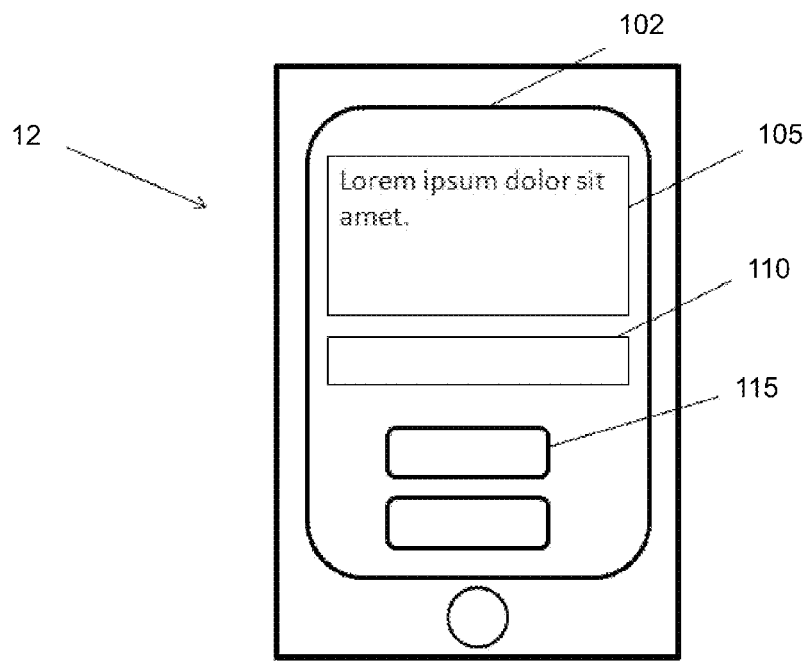
FIG. 2A illustrates one embodiment of a user device for a user to interact with a self service operation.

FIG. 2A illustrates one embodiment of such an intelligent user device 12 which may permit a user to interact in a visual interactive voice response (VIVR) session with a VIVR system. In this embodiment, user device 12 comprises a "smart phone" or a tablet or pad computing device. In other embodiments, user device 12 may comprise any other type of mobile device capable of executing software programs and communicating over a HTTP or TCP/IP connection, and optionally also via a voice connection (e.g., via the public switched telephone network (PSTN)).

User device 12 includes a display device, one or more processors, memory, and one or more user input devices, which may include a touch screen, a keypad, a microphone, a keyboard, a trackball, a mouse, and/or any other known input device. The memory may include a non-transitory data storage medium and may have stored thereon instructions for causing the processor(s) to execute a process for supporting an interaction of a user with a VIVR system, as described in greater detail below.

In some embodiments, user device 12 may include an antenna, a transmitter, and a receiver for communicating over a wireless network. In some embodiments user device 12 may be capable of voice calls and/or data communication over a wireless network, for example a 3G or 4G network. In some embodiments, user device 12 may include a wireless local area network (WLAN) adaptor and antenna for communicating via a WLAN, such as an IEEE 802.11 network. In some embodiments, user device 12 may be able to establish an Internet connection via either a wireless network (e.g., a 3G or 4G network) and/or over a WLAN.

In more detail, FIG. 2A depicts a user interface and application with the ability to render or display various UI controls including, but not limited to, text areas 1005, input fields 1010 and virtual buttons 1015. Other embodiments may include the ability to render commonly accepted UI elements, including but not limited to listboxes, comboboxes, multi-select, scrollable lists and so forth.

In operation during a VIVR session, still referring to FIG. 2A, a user may navigate through a series of user interface screens (UI screens) 1002 which are displayed on a display device of user device 12, selecting various controls available via the various UI screens 1002 in order to resolve a specific issue with a remotely located VIVR system (such as will be described in greater detail below). UI screens 1002 are updated in response to user input received via UI screens 1002 until such time that user issue has been resolved or until such time that the user chooses to communicate with a contact center agent for agent-assisted service to resolve the user's issue. In some embodiments, by the series of actions of presenting a UI screen 1002 to a user, receiving user input in response to the UI screen, and presenting a new UI screen 1002 in response to the user input, a user may traverse through nodes of a decision tree or call tree of VIVR system with which the user interacts, where each node has associated therewith a corresponding UI screen 1002. Here it should be noted that a decision tree is a logical construct rather than a physical entity, and represents an abstraction of a complex algorithm which includes a plurality of optional paths which may be followed by a user while engaged in a VIVR session with a VIVR system to resolve an issue. In some embodiments, user device 12 may execute a client-server session with a remotely located VIVR system, as described below in greater detail, where the data representing the decision tree is stored in a database of the VIVR system, and which communicates data for the UI screen associated with each node of the decision tree to user device 12. In some embodiments, in addition to the UI screens 1002, user device 12 may also receive one or more audio prompts for the VIVR session via a voice connection to the VIVR system.

Still referring to FIG. 2A, buttons 1015 may exist on UI screen 1002 to allow a user at any time during the interaction with the VIVR system to request an agent-assisted service session to resolve the user issue. The agent-assisted service session may take place via a voice call, or via a web chat with an agent at a call center. Additionally, in some embodiments a button 1015 may allow the user to request a call back from the call center agent. Here, a "Call" refers to establishing a voice connection to a call center agent, either via regular "phone" channel (e.g., via the PSTN) if user device 12 includes the capability for such phone calls, or via a voice-over-Internet-protocol (VoIP) client installed and running on user device 12. In some embodiments, buttons 1015 allowing the user to place a call to an agent may additionally display the expected hold time that user would experience if calling or web chatting with an agent at the contact center.

Figure 2B:
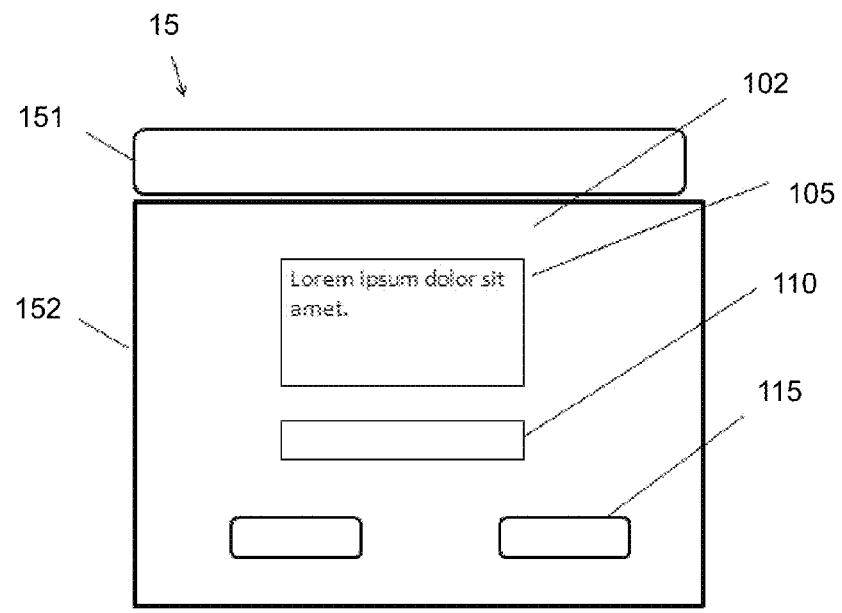
FIG. 2B illustrates another embodiment of a user device for a user to interact with a self service operation.

FIG. 2B illustrates another embodiment of a user device 15 for a user to interact with a VIVR system. User device 15 may include, but is not limited to, a set-top box 151 connected to a display device 152 such as a television display. User device 15 includes one or more processors and memory. Here, it is understood that set-top box 151 is capable of rendering a user interface via a connected display device 150. Alternate embodiments may include, but are not limited to: kiosks, point of sale terminals, ATMs, etc.

In some embodiments, user device 12 or 15 may have associated therewith a variety of sensors and/or data gathering devices, such as a global positioning system (GPS) receiver, a camera, a card swipe or near field readers, and/or other sensors.

In the description to follow, detailed examples and descriptions will be provided in the context of a user employing user device 12, in particular a smart phone. However, as noted above, it should be understood that a variety of other devices or platforms may be employed for the user device, without loss of generality.

As noted above, there is already a huge and valuable installed infrastructure of IVR systems, such as IVR system 10 described above. Also, even though it may be desirable to provide a VIVR service to customers, there continue to be callers from traditional "dumb" telephones which do not have the ability to experience a VIVR service and which will require the traditional IVR service. Additionally, it would be desirable to "stand up" a visual IVR system and service without having to make changes to the components (e.g., media player and application server) of an existing IVR system.

Accordingly, it would be advantageous to provide a system and method for adapting an existing real time IVR system to provide a VIVR service to callers accessing the system from an intelligent user device, such as user devices 12 and 15 described above.

Figure 3:
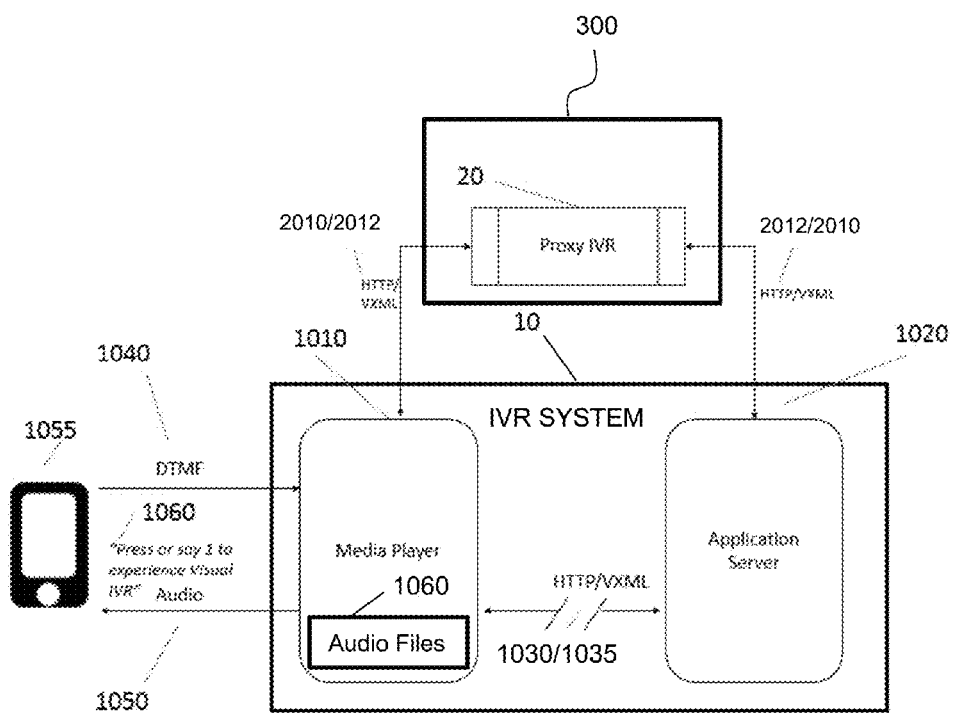
FIG. 3 illustrates an embodiment of an IVR system which has been adapted to support visual IVR (VIVR).

Referring now to FIG. 3, there is shown one embodiment of IVR system 10 which has been adapted to support visual IVR (VIVR) by the addition of an IVR system adaptor 300 including a proxy IVR interface 20. The combination of IVR system 10 and IVR system adaptor 300 is referred to here as VIVR system 3. Callers dialing the regular phone number via user device 1055 to reach the traditional IVR system 10 will be directed to the Proxy IVR interface 20 instead. The direct communication between Media Player 1010 and Application Server 1020 with previously existed in the IVR system 10 is severed, and all communication between Media Player 1010 and Application Server 1020 is instead now passed through the Proxy IVR Interface 20.

In further detail, still referring to FIG. 3, Proxy IVR interface 20 may determine if user device 1055 is a "smart device" such as devices 12 and 15 described above, which can support a VIVR service, or a "dumb telephone" which cannot support a VIVR service. An example embodiment of this process is illustrated in FIGS. 6A-6D which will be discussed in greater detail below. If the caller is phoning from a mobile phone and optionally based on additional business logic, the caller may be offered an option by Proxy IVR interface 20 to opt-in to a VIVR session through which digital and/or visual information is conveyed to the user's device 1055, for example through one or more UI screens 1002. Proxy IVR interface 20 may accomplish this by sending an appropriately structured VXML message or messages to Media Player 1010 which instructs Media Player 1010 to play an audio prompt or opt-in message 1060 to the caller via the user device 1055 inviting the caller to engage in a VIVR session. A user may respond to the invitation by DTMF signal 1040 (and/or optionally voice signal 1042, for clarity omitted from FIG. 3).

Still referring to FIG. 3, when a caller chooses to not opt-in to a VIVR session, or when the user is not offered the option of a VIVR session (for example because the user device is a "dumb" telephone) then Proxy IVR interface 20 will act in a true traditional proxy capacity, merely taking first (e.g., HTTP) message(s) 2010 from Media Player 1010 and passing it/them to Application Server 1020, and the reverse—with second (e.g., VXML) messages 2012 message(s) returned by Application Server 1020 being passed to Media Player 1010. The direct connection between Media Player 1010 and Application Server 1020 no longer exists. Because the traffic between Media Player 1010 and Application Server 1020 is now passing through the Proxy IVR interface 20, data associated with first and second messages 2010 and 2012 can optionally be logged for analytics and reporting.

Figure 4:
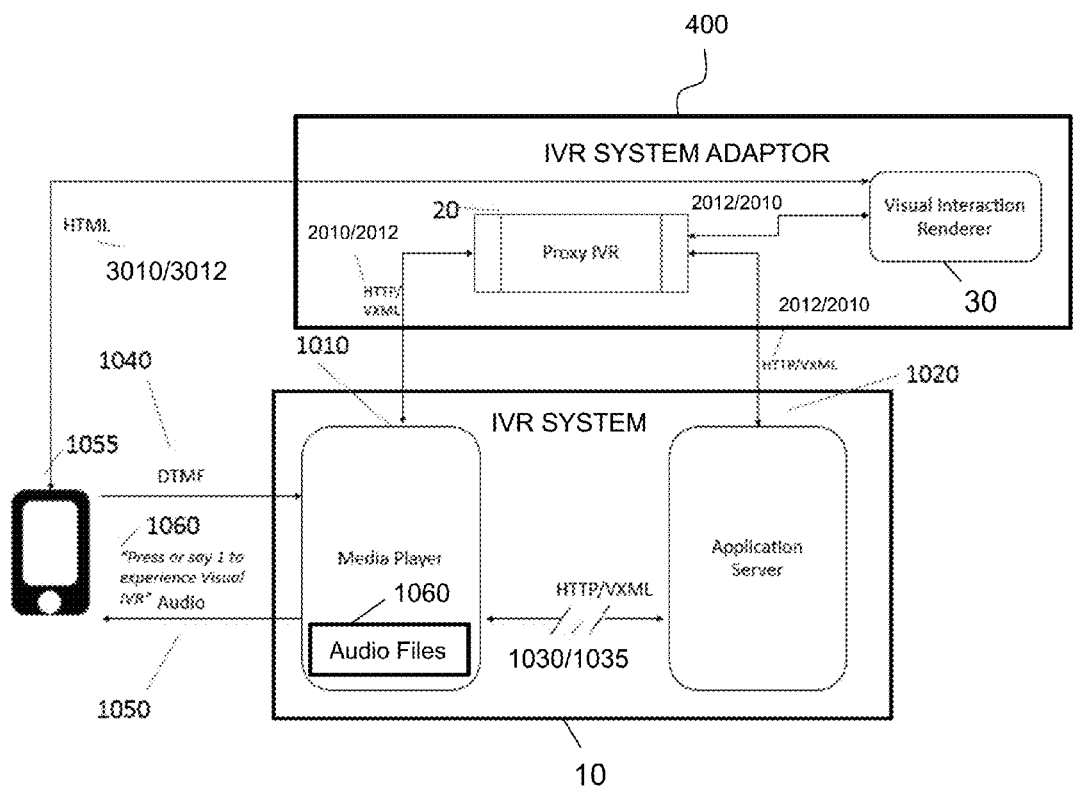
FIG. 4 illustrates in more detail an embodiment of an IVR system which has been adapted to support VIVR.

Referring now to FIG. 4, there is shown an example of a VIVR system 4 which includes an IVR System Adaptor 400. Here, IVR System Adaptor includes Proxy IVR Interface 20 and Visual Interaction Renderer 30.

FIG. 4 also illustrates a process of VIVR system 4 when a caller opts into a digital session of VIVR session. The caller does so by responding to the opt-in prompt—in this example, by pushing "1" on their phone in response to the prompt—which sends DTMF signal 1040 to Media Player 1010, which in turns sends one or more first (e.g., HTTP) messages 2010 to Proxy IVR interface 20. Although not shown in FIG. 4, alternatively in some embodiments a user may respond via a voice signal 1042 as shown in FIG. 1 and omitted from FIGS. 3 and 4 for clarity. Proxy IVR interface 20, now knowing that the caller has opted into a VIVR session, engages Visual Interaction Renderer 30 which either sends a SMS or a Push message (not depicted here) to mobile device 1055.

This SMS or Push message may include a link to a visual session. The caller may then click on the link on their user device 1055 which starts an HTTP session with Visual Interaction Renderer 30.

Via first messages 2010 (e.g., HTTP messages), Proxy IVR interface 20 requests from Application Server 1020 the first set of prompts to display, and is supplied with the prompts via second (e.g., VXML) message(s) 2012. Proxy IVR interface 20 sends the second (e.g., VXML) messages(s) 2012 to Visual Interaction Renderer 30 which converts second (e.g., VXML) message(s) 2020 to a suitable format for communication with a Visual Protocol, such as HTML5 (for example), to produce fourth message(s) 3012. However, it should be understood that in other embodiments, other message formats suitable format for rendering on devices, phones, kiosks, etc may be employed for fourth messages 3012. Fourth messages 3012 are returned and rendered on user device 1055. Simultaneously, and optionally, Proxy IVR Interface 20 may instruct Media Player 1010 to play an Audio prompt 1050.

In further detail, still referring to FIG. 4, the caller responds to the visual options in fourth messages 3012 by selecting an option on a touchscreen of user device 1055. Third (e.g., HTML) message(s) 3010 is/are sent from user device 1055 to Visual Interaction Renderer 30 which converts third HTML message(s) 3010 to first message(s) 2010 which can be understood and processed by Application Server 1020, and hands first message(s) 2010 to Proxy IVR interface 20. Proxy IVR interface 20 retrieves the next step of the interaction by querying Application Server 1020 via first message(s) 2010, and Application Server 1020 sends second (e.g., VXML) message(s) 2012 back to Proxy IVR Interface 20. Proxy IVR interface 20 engages Visual Interaction renderer 30 to convert second (e.g., VXML) message(s) 2012 to fourth (e.g., HTML5) message(s) 3012. Visual Interaction Renderer 30 responds to mobile device 1055 with fourth message(s) 3012 representing the converted VXML message(s). Optionally, Proxy IVR Interface 20 may simultaneously instruct Media Player 1010 to play an Audio prompt 1060 to user device 1055 via audio connection 1050. This cycle now continues until the conclusion of the user's VIVR session.

Figure 5:
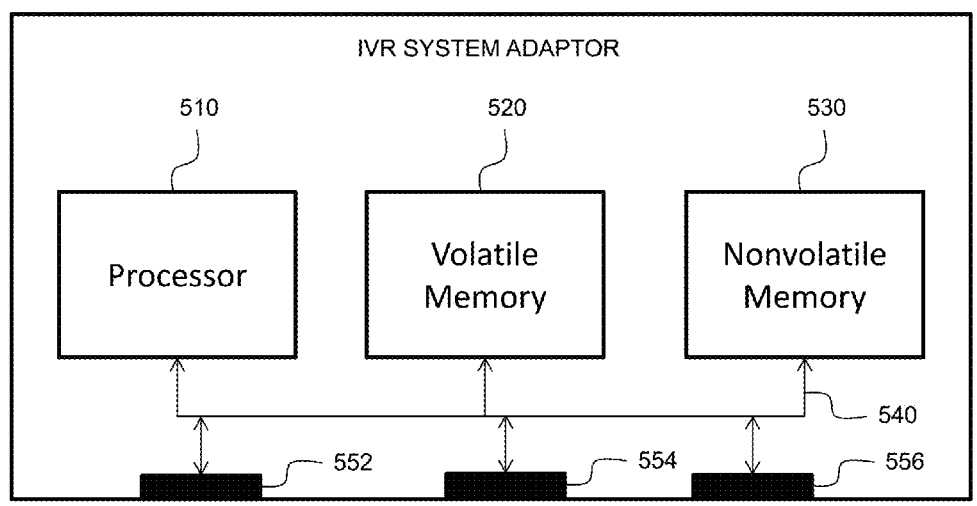
FIG. 5 illustrates embodiment of an IVR system adaptor which may be employed to adapt an existing IVR system to support a VIVR service.

FIG. 5 illustrates embodiment of an IVR System Adaptor 500 which may be one embodiment of IVR System Adaptor 400 which may be employed to adapt an existing IVR system (e.g., IVR system 10) to support a VIVR service. IVR system adaptor 500 includes a processor 510, volatile memory 520, and nonvolatile memory 530 connected by a communication bus 540. IVR System Adaptor 500 also includes one or more interface ports for communicating messages with other devices. Here, IVR System Adaptor 500 includes a first interface port 552 (for example, for communicating with Media Player 1010), a second interface port 554 (for example, for communicating with Application Server 1020), and a third interface port 556 (for example, for communicating with user device 1055). Communication ports 552, 554 and 556 should best be viewed as logical constructs, and they may employ the same or different hardware elements.

In practice, nonvolatile memory 530 may store instructions or executable code which may be executed by processor 510 to perform one or more functions of IVR System Adaptor 500, such as the functions of Proxy IVR Interface 20 and/or Visual Interaction Renderer 30. Upon initialization of IVR System Adaptor 500, the executable code may be transferred to volatile memory 520 which may include a working memory for processor 510.

Although FIG. 5 illustrates an embodiment where a common processor and memory may execute the functions of both Proxy IVR Interface 20 and Visual Interaction Renderer 30, in other embodiments Proxy IVR Interface 20 and Visual Interaction Renderer 30 may employ separate processors and/or memory.

Figure 6A:
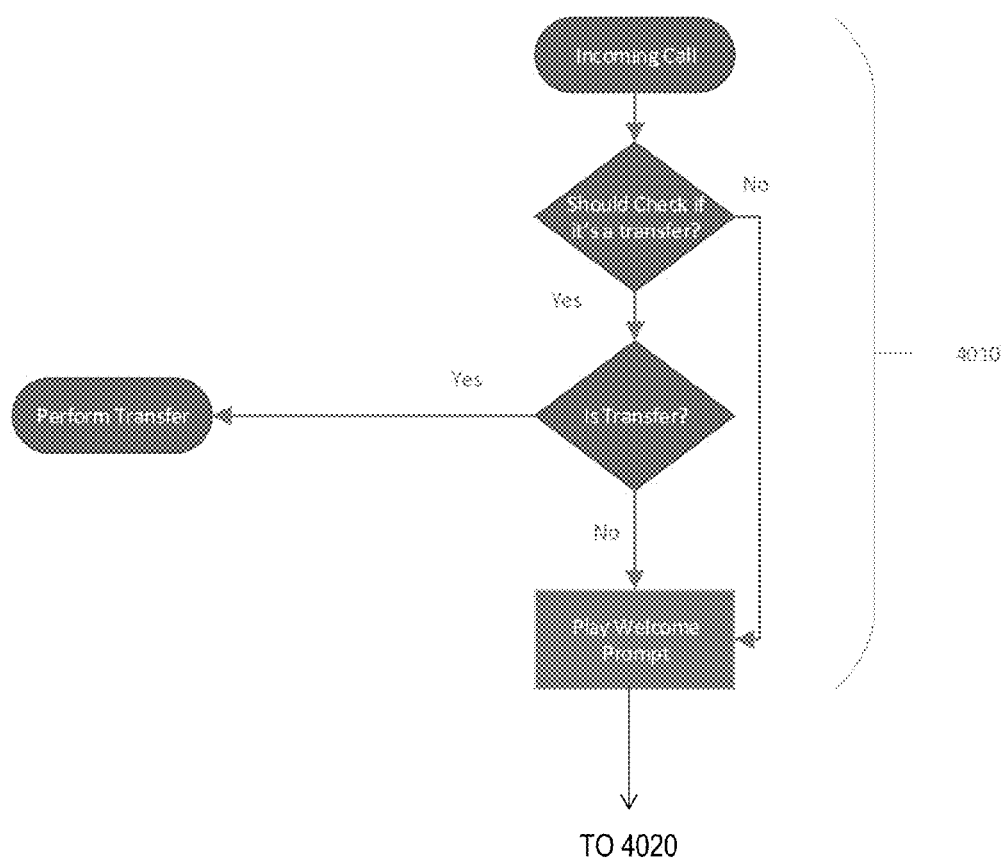
FIGS. 6A, 6B, 6C and 6D depict a logical sequence flow of a typical interaction from a voice caller and opting into a digital session.

FIGS. 6A-6D illustrates an embodiment of operations of Proxy IVR Interface 20 from a sequence or flow perspective. As shown in FIG. 6A, flowchart section 4010 depicts an incoming voice call. Prior to the addition of IVR system adaptor 500, IVR Application Server 1020 in IVR system 10 would first receive the call. However with VIVR system 4 including IVR system adaptor 400, Proxy IVR interface 20 receives the call instead. If this call is related to an internal transfer, it is managed as any call transfer would be managed. Proxy IVR Interface 20 then plays a welcome prompt (e.g.: "Thank you for calling . . . ") by returning VXML message for an audio prompt 1060 to media player 1010.

Figure 6B:
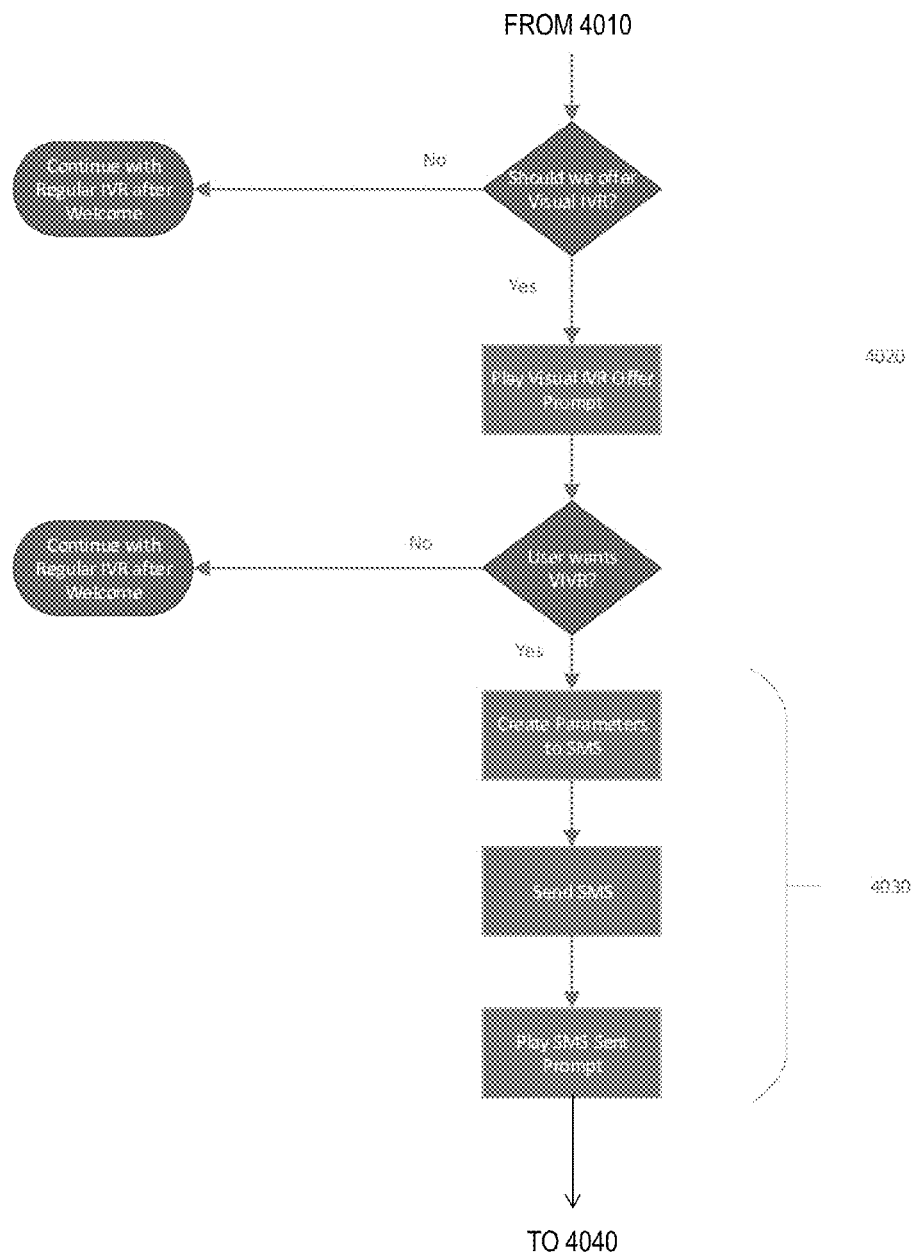

Referring to FIG. 6B, flowchart section 4020 depicts Proxy IVR interface 20 now determining whether to offer a visual or digital session to the caller. Only users calling from a smartphone or equivalent data-enabled intelligent user device 1055 can opt-in to a visual or digital session. Proxy IVR interface 20 can optionally perform a Carrier Lookup to determine the type of phone and the network carrier being used. If the caller's device supports a VIVR or digital session, or there was no way to perform a Caller Lookup, Proxy IVR Interface 20 will play a prompt or opt-in message to the user to ask if they wish to engage digitally (see FIGS. 3 & 4, prompt 1060) via a VIVR session. If the user selects No, the process will continue with the regular voice IVR in proxy mode as described above. If the user wishes to engage in a VIVR session, then the user will respond to the prompt via DTMF signal 1040 and/or a voice response via voice signal 1042. In some embodiments, Proxy IVR Interface 20 may be able to improve (i.e., increase) the percentage of users who opt-in to VIVR/digital sessions by automatically split-testing different opt-in messages, as will described in greater detail below with respect to FIG. 7.

Figure 6C:
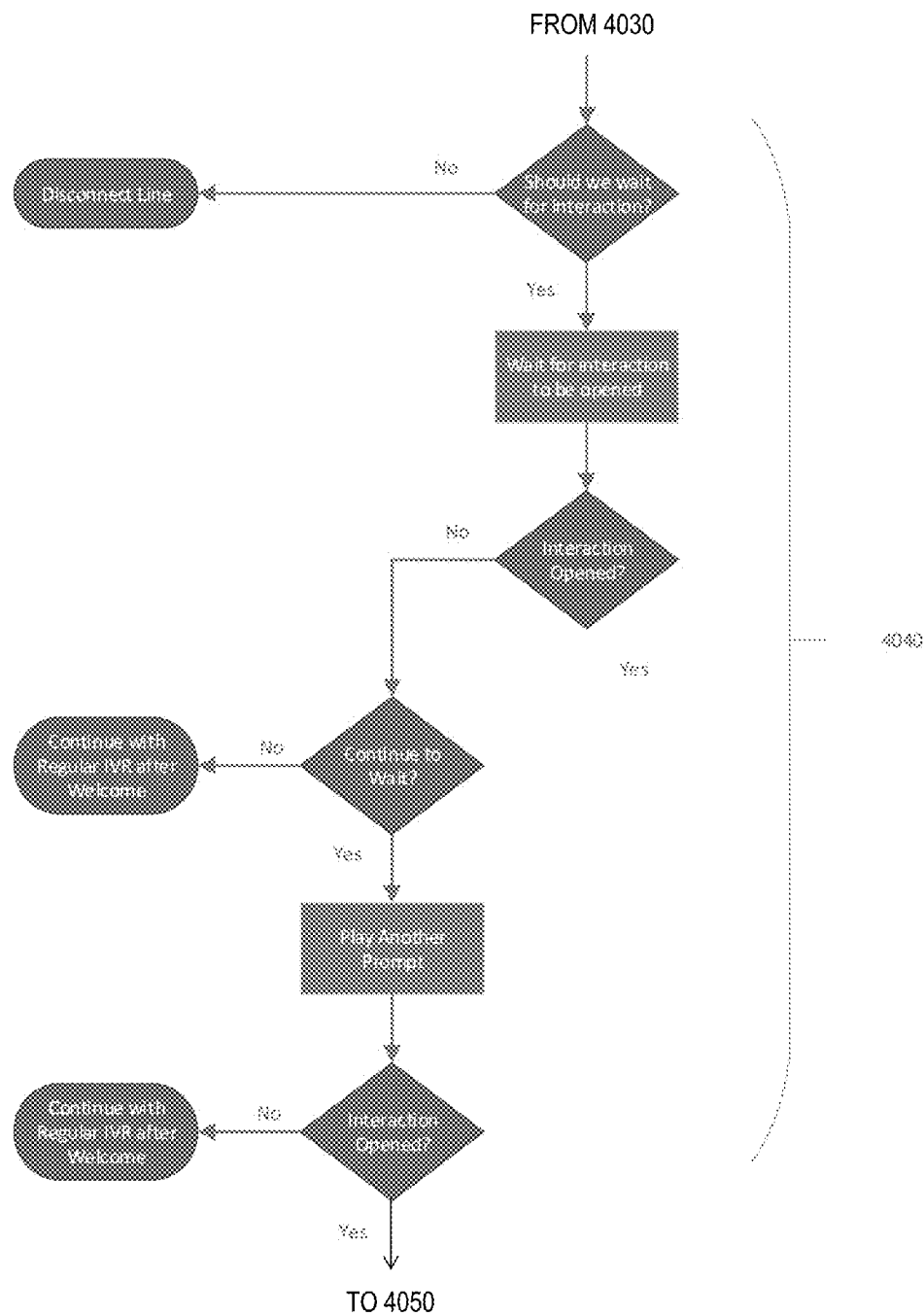
Figure 6D:
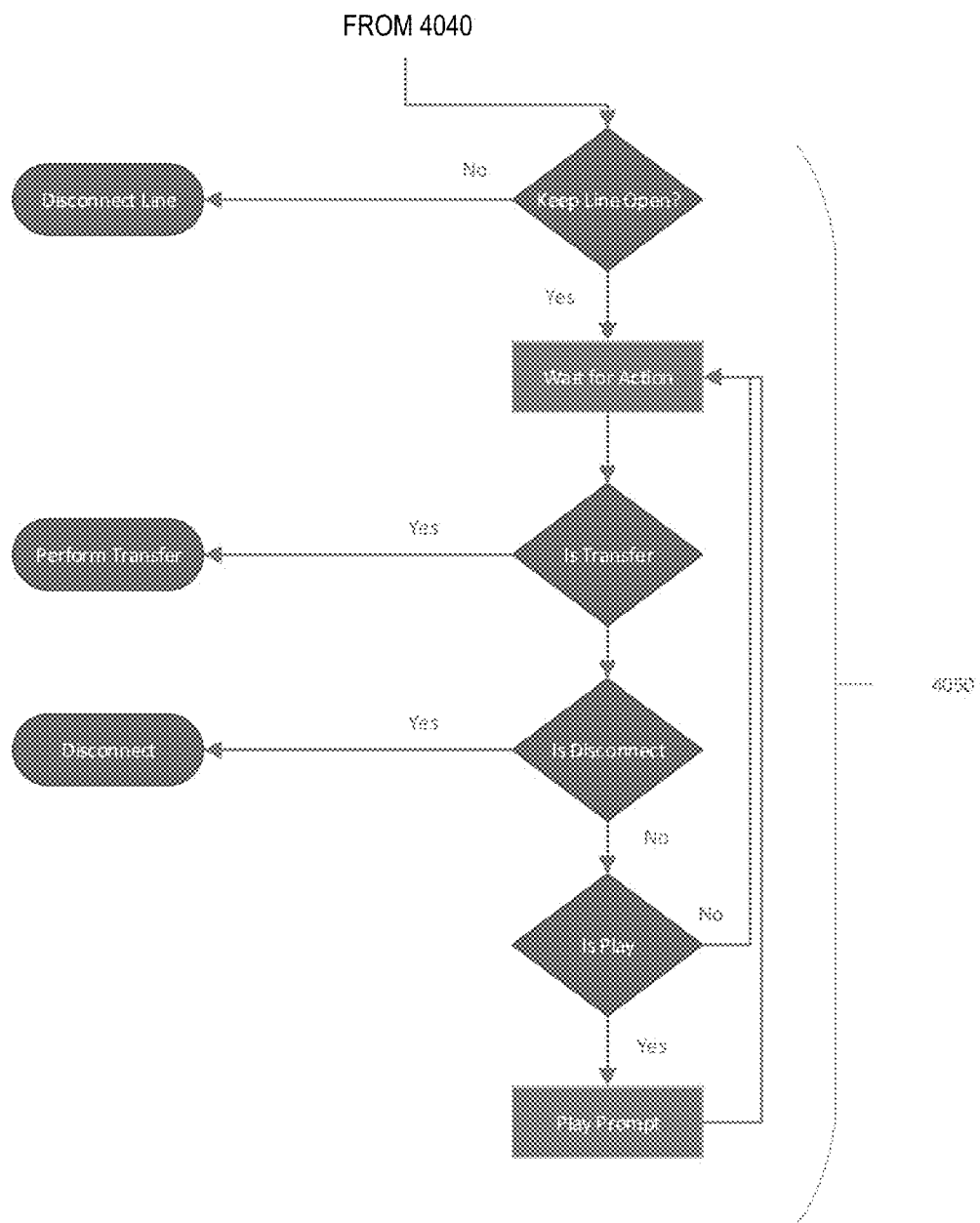

Referring to FIG. 6C, flowchart section 4030 depicts the continued flow when the user has selected to opt-in to a visual/digital session. IVR system adaptor 400 constructs an SMS link and texts it (or pushes it) to the caller's user device 1055. While the caller waits for the link, Proxy IVR Interface 20 may instruct Media Player 1010 to play a prompt or message to alert the user that a text message has been sent.

Flowchart section 4040 depicts how IVR system adaptor 400 waits for the user to click on the received link via user device 1055 in order to continue. This may be accomplished by Visual Interaction Renderer 30 receiving one or more third messages from user device 1055. Visual Interaction Renderer 30 then notifies Proxy IVR Interface 20 that the request for the VIVR session has been received.

Once the VIVR interaction has been initiated, the flow moves to flowchart section 4050. Based on the earlier carrier lookup or additional business rules, Proxy IVR interface 20 determines whether the voice line can or should be kept open now that the user has opted-in to a digital session. If the user is on a carrier that does not support dual Voice and Data transmission, the voice connection will be automatically terminated with our without an optional warning or alert to the user. Proxy IVR Interface 20 now engages in a loop to play the various audio prompts to the user based on input from Visual Interaction Renderer 30. Specifically, referring to FIG. 4, the user makes a selection via user device 1055 which is received by Visual Interaction Renderer 30 via third message(s) 3010. This information is converted or translated into the format of first messages 2010 which is understood by Application Server 1020 and passed to Proxy IVR Interface 20 which sends first message or messages 2010 to Application Server 1020. Application Server 1020 responds with one or more second (e.g., VXML) messages 2012 to Proxy Server Interface 20, which passes second (e.g., VXML) message(s) 2012 to Visual Interaction Renderer 30. Visual Interaction renderer 30 converts or translates second (e.g., VXML) messages 2012 to fourth (e.g., HTML5) messages 3012 and sends fourth messages 3012 to user device 1055. The cycle repeats until the interaction is concluded.

Figure 7:
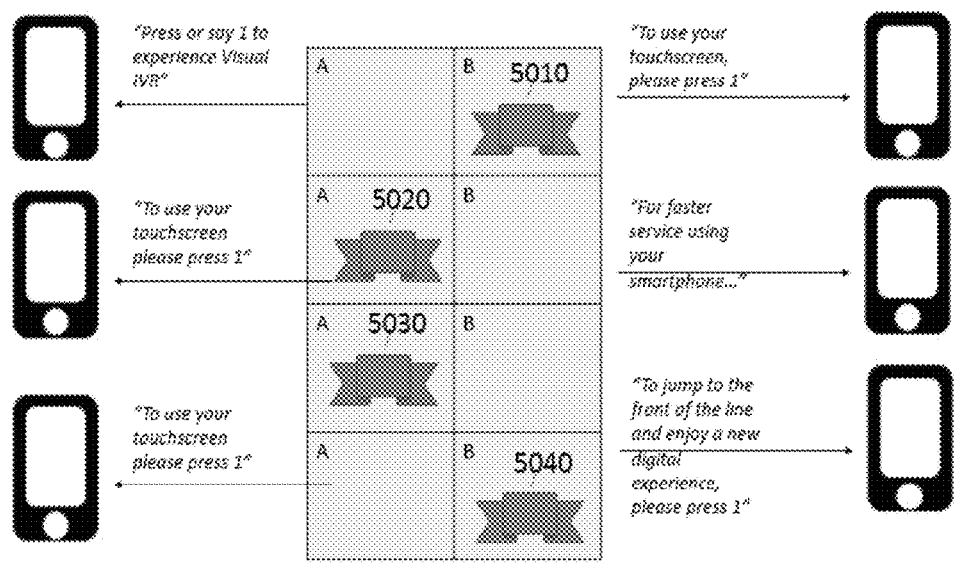
FIG. 7 depicts an example of an IVR system adaptor performing message testing to maximize conversion into the digital session.

FIG. 7 illustrates on embodiment of a process by which Proxy IVR Interface 20 may automatically AB test opt-in messages to maximize opt-in to VIVR sessions. As depicted in FIG. 6, element 4020, and in FIG. 3 element 1060, Proxy IVR Interface 20 causes Media Player 1010 plays a voice prompt to eligible callers inviting them to opt-in to a VIVR or digital session, instead of proceeding with a voice-only IVR session. Maximizing this opt-in is key to reducing costs within the environments in which IVR system adaptor 400 operates. For example, Proxy IVR Interface 20 may contain a table of alternate messages. 50% of callers may be sent message A, while another 50% of callers may receive message B. After a determined statistically-relevant sample is achieved with a sufficient level of confidence, a winner is selected 5010. The winner, message B, in this instance becomes the new message A 5020 and is then tested with a new message B. In this example, message A wins against multiple message B tests 5030 and remains message A. Then a new message B 5040 wins against the existing message A, and this message B will now be the new message A. This process may continue until no additional messages are left to be tested.

Figure 8:
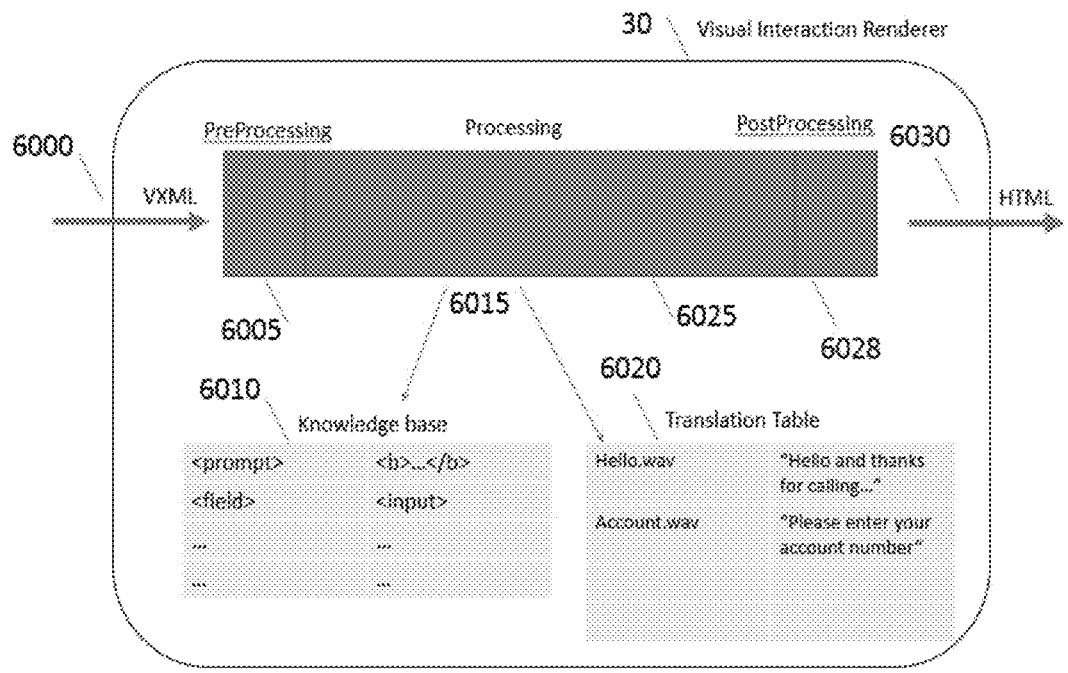
FIG. 8 depicts an embodiment of a process of a Visual Interaction Renderer converting VXML messages to HTML5 messages.

FIG. 8 illustrates one embodiment of how Visual Interaction Renderer 30 may operate to dynamically convert VXML messages into HTML5 messages. VXML messages are one embodiment of second messages 2012 and HTML5 messages are one embodiment of fourth messages 3012, but alternate message formats may be employed. VXML messages 2012 from Proxy IVR Interface 20 are passed to Visual Interaction renderer 30 via input 6000, and Visual Interaction renderer 30 outputs HTML5 messages (or messages in another similar presentation markup format) via output 6030. Visual Interaction Renderer 30 consists broadly of three functional blocks: Pre-processing unit 6005, Conversion unit 6015 and Post-processing unit 6028.

In further detail, still referring to FIG. 8, Pre-processing unit 6005 checks for well-formed VXML messages, as well as identifying VXML messages that should be aggregated into one HTML message. For example, in a voice IVR it is typical to request discreet pieces of information in a sequential manner. However, this same set of sequential information on a visual device would be better suited to be conveyed as one HTML message to user device 1055 to be displayed together on the display device of user device 1055.

Still referring to FIG. 8, after Pre-processing unit 6005 has completed its pre-processing, conversion unit 6015 performs a conversion process. The conversion process consults with a Knowledge base 6010 and a translation table 6020. Knowledge base 6010 consists of all the rules for converting VXML messages to the desired output format (in this example HTML5). For example, a VXML message 6020 may contain a <prompt> tag. However, Internet browsers and other HTML consumers do not understand this tag. Knowledge base 6010 converts the <prompt> tag such that it is displayed in HTML maybe as a bold font statement on the user device 1055. Similarly all the various VXML tags are assigned an equivalent HTML representation. It should be noted that Visual Interaction Renderer 30 is not limited to outputting HTML messages. By modifying Knowledge Base 6010, Pre-processor unit 6005, conversion process unit 6015, Translation Table 6020 and Post-processor unit 6028, different forms of output can be achieved. Knowledge Base 6010 can also interpret additional tags that are added to VXML messages that are ignored by the Voice IVR process but which may be interpreted by VIVR system 4 in a VIVR session. This allows VXML messages to be enriched for an intelligent user device 1055 without causing "breakage" of the voice IVR.

Still referring to FIG. 8, Translation Table 6020 is used by conversion process unit 6015 to provide the textual equivalent of the audio files used by the voice IVR. For example, the Voice IVR system 10 may request Media Player 1010 to play "hello.wav" as the introduction. When represented digitally or visually, the text equivalent needs to be displayed on user device 1055. Some embodiments of Visual Interaction Renderer 30 may utilize Speech-To-Text programmatic/dynamic conversion instead of a translation table. It should be apparent that additional business logic or rules can be applied to facilitate rendering of VXML as HTML, including but not limited to automatic translation of the audio prompts to text equivalents, batching multiple audio prompts into one visual screen and more.

Still referring to FIG. 8, the Post Processing unit 6028 allows Visual Interaction Renderer 30 to make any additional needed adjustments to the output format. This may include but is not limited to variances in HTML across different platforms. Finally, HTTP messages (as an example of fourth messages 3012) are the output by Visual Interaction Renderer 30 to be rendered on user device 1055.

While the foregoing written description enables one of ordinary skill to make and use what is considered presently to be the best mode thereof, those of ordinary skill will understand and appreciate the existence of variations, combinations, and equivalents of the specific embodiment, method, and examples herein. Such variations would become clear to one of ordinary skill in the art after inspection of the specification, drawings and claims herein. The invention should therefore not be limited by the above described embodiment, method, and examples, but by all embodiments of devices, systems, and methods within the scope and spirit of the invention.

We claim:

1. An interactive voice response (IVR) system adaptor for adapting an IVR system to support a visual IVR (VIVR) service, wherein the IVR system includes an application server and a media player which is configured to interface with an incoming call from a user via a user device, the IVR system adaptor, comprising:
a proxy IVR interface which is configured to instruct the media player to present the user with a first option to proceed with an audio-only call and a second option to engage in a VIVR session including display of visual information on the user device; and
a visual interaction renderer,
wherein when the user selects the first option:
the proxy IVR interface receives first messages output from the media player and passes the first messages received from the media player to the application server, and
the proxy IVR receives second messages from the application server and passes the second messages received from the application server to the media player, and
wherein when the user selects the second option:
the visual interaction renderer receives third messages from the user device and translates the third messages into the first messages,
the proxy IVR interface:
receives the first messages from the visual interaction renderer and passes the first messages received from the visual interaction renderer to the application server, and in response thereto
receives the second messages from the application server, and
passes the second messages received from the application server to the visual interaction renderer, and
the visual interaction renderer converts the second messages to fourth messages, and sends the fourth messages to the user device.

2. The IVR system adaptor of claim 1, wherein the first messages are HTTP messages, the second messages are VXML messages, the third messages are HTML messages, and the fourth messages are HTML5 messages.

3. The IVR system adaptor of claim 1, wherein the visual interaction renderer employs a set of rules for converting the second messages to the fourth messages.

4. The IVR system adaptor of claim 3, wherein the set of rules is stored in a knowledge database in a memory device of the IVR system adaptor.

5. The IVR system adaptor of claim 1, wherein the visual interaction renderer is configured to perform a batch operation to convert a plurality of the second messages to one of the fourth messages.

6. The IVR system adaptor of claim 1, wherein the IVR system adaptor is further configured to determine whether the user device is capable of engaging in the VIVR session before instructing the media player to present the user with the first option and the second option.

7. The IVR system adaptor of claim 1, wherein the proxy IVR interface instructs the media player to present the user with the first option and the second option via a selected one of a plurality of opt-in messages, wherein the proxy IVR interface is further configured to test the various ones of the opt-in messages to determine which one of the plurality of opt-in messages yields a highest opt-in rate for the VIVR session by a plurality of users.

8. A method for adapting an IVR system to support a visual IVR (VIVR) service, wherein the IVR system includes an application server and a media player which is configured to interface with an incoming call from a user via a user device, the method comprising:
instructing the media player to present the user with a first option to proceed with an audio-only call and a second option to engage in a VIVR session including display of visual information on the user device;
receiving a response from the user device;
when the response indicates selection of the first option, passing, via an IVR system adaptor, first messages output from the media player to the application server, and passing via the IVR system adaptor second messages from the application server to the media player; and
when the response indicates selection of the second option the IVR system adaptor:
receiving third messages from the user device,
translating the third messages into the first messages, passing the first messages to the application server, and in response thereto receiving the second messages from the application server, converting the received second messages to fourth messages, and sending the fourth messages to the user device.

9. The method of claim 8, wherein adapting the IVR system to support the VIVR service does not include making changes to the media player and the application server.

10. The method of claim 8, further comprising, when the response indicates selection of the first option:

receiving at the media player a prompt from a user comprising at least one of a voice input signal and a dual-tone multi-frequency (DTMF) input signal;

converting the at least one of voice input signal and DTMF input signal from the user into the first messages output from the media player to the application server;

the application server parsing the first messages to determine a user input;

the application server determining from the user input a selected audio file among a plurality of audio files stored in memory accessible by the media player for responding to the user input; and the application server constructing the second messages to the media player to instruct the media player to play the selected audio file to the user.

11. The method of claim 8, further comprising when the response indicates selection of the second option:

receiving at the media player a prompt from a user comprising at least one of a voice input signal and a dual-tone multi-frequency (DTMF) input signal;

the IVR system adaptor converting the at least one of voice input signal and DTMF input signal from the user into the first messages output from the media player to the application server;

the application server parsing the first messages to determine a user input;

the application server determining from the user input a selected audio file stored at the media player for responding to the user input; and the application constructing the first VXML messages to the media player to instruct the media player to play the selected audio file to the user.

12. The method of claim 8, further comprising, before instructing the media player to present the user with the first option and the second option:

receiving a call from the user; and determining whether the user device is capable of engaging in the VIVR session.

13. The method of claim 8, further comprising employing a set of rules for converting the second messages to the fourth messages.

14. The method of claim 13, wherein the set of rules is stored in a knowledge database in a memory device of the IVR system adaptor.

15. The method of claim 8, further comprising performing a batch operation to convert a plurality of the second messages to one of the fourth messages.

16. A system, comprising:

a media player configured to interface with an incoming call from a user received via a user device, to provide prompts to the user, and to receive responses from the user, the media player being configured to output first messages including information corresponding to the responses from the user;

an application server configured to receive the first messages, and in response thereto to output second messages indicating specific ones of the prompts to be provided to the user; and an interactive voice response (IVR) system adaptor which is configured to instruct the media player to present the user with a first option to proceed with an audio-only call and a second option to experience a multimedia call including display of visual information on the user device;

wherein when the user selects the first option, the IVR system adaptor passes the first messages output from the media player to the application server, and to pass the second messages from the application server to the media player, and wherein when the user selects the second option, the IVR system adaptor receives third messages from the user device, converts the third messages into the first messages, passes the first messages to the application server, receives the second messages from the application server in response to the first messages, converts the second messages to fourth messages, and sends the fourth messages to the user device.

17. The system of claim 16, wherein the IVR system adaptor comprises:

a proxy IVR interface which is configured to instruct the media player to present the user with the first option and the second option, wherein when the user selects the first option, the proxy IVR interface passes the first messages output from the media player to the application server, and passes the second messages from the application server to the media player; and a visual interaction renderer, wherein when the user selects the second option:

the visual interaction renderer receives the third messages from the user device and translates the third messages into the first messages, the proxy IVR interface:

passes the first messages to the application server, and in response thereto receives the second messages from the application server, and passes the second messages to the visual interaction renderer, and the visual interaction renderer converts the second messages to the fourth messages, and sends the fourth messages to the user device.

18. The system of claim 17, wherein the visual interaction renderer employs a set of rules for converting the second messages to the fourth messages.

19. The system of claim 18, wherein the set of rules is stored in a knowledge database in a memory device of the IVR system adaptor.

20. The system of claim 17, wherein the visual interaction renderer is configured to perform a batch operation to convert a plurality of the second messages to one of the fourth messages.

* * * * *